United States Patent [19]

Taylor et al.

[11] Patent Number: 5,264,482

[45] Date of Patent: Nov. 23, 1993

[54] WATER-BASED AUTOXIDISABLE COATING COMPOSITION

[75] Inventors: Philip L. Taylor, Burnham; Julian J. Gosling, Slough; Charles W. A. Bromley, Bourne End; Peter F. Nicks, Maidenhead, all of United Kingdom

[73] Assignee: The Glidden Company, Cleveland, Ohio

[21] Appl. No.: 772,201

[22] Filed: Oct. 7, 1991

Related U.S. Application Data

[63] Continuation-in-part of Ser. No. 602,655, Oct. 24, 1990, abandoned, which is a continuation-in-part of Ser. No. 519,734, May 7, 1990, abandoned.

[30] Foreign Application Priority Data

Oct. 26, 1989 [GB] United Kingdom ............... 8924124

[51] Int. Cl.$^5$ .................. C08J 3/00; C08K 3/20; C08L 37/00; C08F 267/04
[52] U.S. Cl. .................................... 524/548; 524/556; 524/558; 525/285; 525/286; 525/119; 523/406; 526/318.42
[58] Field of Search ............ 524/548, 556, 558; 525/285, 286, 119; 523/406, 407; 526/318.42

[56] References Cited

U.S. PATENT DOCUMENTS

| | | | |
|---|---|---|---|
| 3,953,408 | 4/1976 | Hosoi | 260/836 |
| 3,976,614 | 8/1976 | Elms | 260/29.4 UA |
| 4,216,302 | 8/1980 | Skillicorn | 526/312 |
| 4,294,735 | 10/1981 | Bentley | 260/22 |
| 4,304,701 | 12/1981 | Das et al. | 523/408 |

FOREIGN PATENT DOCUMENTS

| | | |
|---|---|---|
| 131619 | 9/1968 | Czechoslovakia . |
| 0288865 | 4/1987 | European Pat. Off. . |
| 350684 | 1/1990 | European Pat. Off. . |
| 1492374 | 10/1967 | France . |
| 48-94733 | 12/1973 | Japan . |
| 53-43731 | 4/1978 | Japan . |
| 83-0151 | 1/1983 | PCT Int'l Appl. . |
| 1476584 | 7/1977 | United Kingdom . |
| 1486711 | 9/1977 | United Kingdom . |
| 1514804 | 6/1978 | United Kingdom . |
| 2002781 | 2/1979 | United Kingdom . |
| 02548 | 6/1979 | United Kingdom . |
| 2053934 | 2/1981 | United Kingdom . |
| 025285 | 3/1981 | United Kingdom . |

OTHER PUBLICATIONS

Odian, George, *Principles of Polymerization*, 2nd ed. 1981 pp. 20–25 and 279–281.

*Primary Examiner*—Paul R. Michl
*Assistant Examiner*—Patrick Niland
*Attorney, Agent, or Firm*—Thomas M. Schmitz

[57] ABSTRACT

A water-based autoxidizable coating composition, especially a gloss or partial gloss coating composition (e.g. paint, varnish, woodstain or timber preservative) suitable for application at ambient temperatures which comprises water, preferably organic cosolvent and a partially esterified carboxylic acid film-forming copolymer at least partially neutralized by monovalent cations wherein the copolymer contains added 3-allyloxy-2-hydroxypropyl groups or certain analogues derived from addition of allyl glycidyl ether or certain of its analogues to carboxylic acid groups, in a copolymeric backbone portion derivable from a prepolymer of weight average molecular weight less than 30 000. The partially esterified copolymer has an acid value of 25 to 60 and preferably a dynamic solution viscosity of 1 to 500 Pa.sec measured in 1-methoxy-2-hydroxy propane by oscillatory parallel plate rheometer. The coatings lap well, dry quickly and achieve acceptable water resistance. Also the optionally unneutralized copolymer and the coating composition when containing a minor amount of particulate copolymer which is found to improve gloss. Discoloration on ageing may be improved by neutralizing with Group 1 metal cations.

24 Claims, No Drawings

WATER-BASED AUTOXIDISABLE COATING COMPOSITION

This application is a continuation in part of Ser. No. 07/602,655 filed on Oct. 24, 1990 now abandoned, which in turn was a convention application based on United Kingdom Priority Application 8924124.4 filed Oct. 26, 1989, and was also a continuation in part of Ser. No. 07/519,734 filed May 7, 1990, now abandoned.

This invention relates to a water-based autoxidisable air-drying coating composition, especially a gloss (including partial gloss) coating composition suitable for application at ambient temperatures which comprises water, a minor amount of water-miscible organic cosolvent, a drier which promotes autoxidation and an at least partially neutralised partially esterified carboxylic acid film-forming copolymer. The invention also relates to a coating composition of this type which additionally comprises dispersed particles of water-insoluble organic polymeric material. The invention further relates to an optionally neutralised partially esterified carboxylic acid film-forming copolymer which is suitable for use in these coating compositions when suitably neutralised. Water-based compositions are more environmentally welcome than those based entirely on organic solvents.

The air-drying coating composition will generally be a paint, varnish, woodstain or timber preservative applicable by brush, roller, pad or spray to architectural surfaces, fittings or furnishings, that is to say surfaces usually found in buildings or on furniture. A good paint or varnish for use on such surfaces must lap well at ambient temperatures, that is to say when adjacent and overlapping bands of paint are applied to a substrate one after another and allowed to dry, it should be difficult for a casual observer to detect a boundary between adjacent contiguous bands of dried paint even when one band was applied several minutes after the other. The best paints lap well even when the application of adjacent contiguous bands is separated by as much as 5 minutes. The same is true for varnishes.

BACKGROUND OF THE INVENTION

Hitherto the lapping ability of water-based decorative paints has been inferior to that of organic solvent-based paints, especially solvent-based paints comprising alkyd resin and white spirit. This inferiority is particularly noticeable with gloss or partial gloss paints, that is to say paints which dry to produce a coating having a specular gloss at an angle of 60° of at least 30% (or at least 65% for high gloss) where specular gloss at 60° is measured according to ASTM Test D523 using light reflected at an angle of 60° to the normal to the surface of the paint. Water-based air-drying gloss paints have been proposed which comprise water and an aqueous colloidal dispersion of water-insoluble film-forming polymer (including copolymers) such as for example a polymer or co-polymer of alkyl acrylate (including methacrylate). When such paints dry on a surface, the particles of polymer begin to coalesce to form a coherent film of coalesced particles which coats the surface but which dries so quickly that the particles of film-forming polymer begin to coalesce too quickly. This means that in practice there is not always time for a band of paint to lap with a subsequently applied adjacent contiguous band. Failure to lap creates unsightly evidence of boundaries in a coating and especially in a coating of the type which dries to produce a gloss or partial gloss finish.

Attempts were made to improve lapping ability by slowing down the speed at which the water-based paint dried. This was done by adding high boiling solvent to the water. Some improvement was achieved, but the lapping ability was still unacceptably low, falling well short of what could be achieved from organic solvent-based paint. In addition the slowing down of drying is in itself undesirable because wet coatings ought to dry as quickly as possible. Usually a wet coating should become dry to the touch after 10 (preferably after 6) hours at ambient temperatures and dry enough to receive a further coating usually after 48 (preferably after 16) hours from application.

British Patent Specifications GB 1 476 584 and GB 2 053 934A disclose water-based autoxidisable air-drying coating compositions which contain as their binder material a neutralised copolymer of for example acrylic acid with alkyl acrylate and/or methacrylate and also a comonomer which is a condensate of glycidyl or hydroxyalkyl ester of acrylic acid with a long chain unsaturated fatty acid such as linseed oil fatty acid. The unsaturation in the acrylic ester portion of the condensate allows the condensate to copolymerise with the acrylic acid and alkyl acrylate or methacrylate comonomers whilst the portion of the condensate derived from the long chain fatty acid confers autoxidisability to the copolymeric binder material. Unfortunately, this portion derived from the long chain fatty acid is highly hydrophobic and so a high concentration of neutralising ions is needed to make the copolymer soluble in water and as a result the dried paints are too easily disfigured by water.

Preferably coating compositions should also have a good resistance to discolouration (more particularly yellowing) with age.

An object of this invention is to provide a water-based autoxidisable air-drying coating composition suitable for application at ambient temperatures which laps well yet dries quickly in air and achieves an adequate resistance to disfiguration by water. A refinement of the invention provides a coating composition having improved resistance to discolouration on ageing. Another refinement of the invention provides a coating composition having improved gloss. Another objective of the invention is to provide a partially esterified carboxylic acid film-forming copolymer which is suitable for use in coating compositions of this invention when suitably neutralised.

A further refinement of the invention is provided by the discovery that dynamic solution viscosity as measured in 1-methoxy-2-hydroxy propane (MHP) by an oscillatory parallel plate rheometer can be used to select certain specified partially esterified carboxylic acid film-forming copolymers which enable the above objectives to be met. MHP is

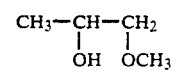

These and other advantages of this invention will become more apparent by reference to the detailed description and the illustrative examples.

SUMMARY OF THE INVENTION

Accordingly this invention provides a water-based autoxidisable air-drying coating composition suitable for application at ambient temperatures which comprises water, a preferably minor amount of water-miscible organic cosolvent, a drier which promotes autoxidation and partially esterified carboxylic acid film-forming copolymer which is at least partially neutralised by monovalent cations, wherein:

a) the partially esterified carboxylic acid copolymer comprises (i) a backbone portion derivable from an addition prepolymer which prepolymer has a weight average molecular weight of less than 30 000 and in turn is derivable by copolymerisation of copolymerisable non-acid monomer with unsaturated monocarboxylic acid monomer and/or itaconic acid which acid monomer when copolymerised provides carboxylic acid groups to the addition prepolymer and (ii) 15 to 38 wt % preferably 20% to 38%, (based on the weight of the partially esterified carboxylic acid copolymer before neutralisation) of 3-allyloxy-2-hydroxy-propyl moieties or their 2-alkylallyl and/or butyl analogues (i.e. $-CH_2-CH(OH)-(CH_2)_n-O-(CH_2)_m-CR=CR'R''$ where R, R' and R'' are independently, H or $C_1$ to $C_8$ alkyl preferably H or methyl and m and n are independently 1 or 2) by means of which some of but not all of the carboxylic acid groups of the backbone portion are esterified thereby causing the copolymer as a whole to be partially esterified, b) the acid value of the partially esterified carboxylic acid copolymer before neutralisation is from 25 to 60 mg KOH/g unneutralised partially esterified copolymer and most preferably c) the nature of the partially esterified carboxylic acid copolymer is such that before neutralisation and when measured at 60° C. in a solution consisting of 90 wt % unneutralised partially esterified carboxylic acid copolymer and 10 wt % 1-methoxy-2-hydroxy propane (MHP) using an oscillatory parallel plate rheometer, the copolymer has a Dynamic Solution Viscosity of from 1 to 500 Pa.sec. The neutralised copolymer may be regarded as a salt.

This invention also provides a partially esterified carboxylic acid film-forming copolymer useful as a polymeric binder in the water-based, autoxidisable, air-drying coating of this invention. When used in a coating composition according to this invention, the partially esterified carboxylic acid copolymer should be at least partially neutralised by monovalent cations.

DETAILED DESCRIPTION OF THE INVENTION

The autoxidizable air-drying coating composition of this invention contains a polymeric binder comprising a carboxyl functional addition copolymer of copolymerized ethylenically unsaturated monomers further esterified with an allyl glycidyl ether to provide carboxyl functional ester copolymer having pendant double bonds. Preferred binder compositions are further neutralized by monovalent cations while most preferred compositions contain insoluble polymer particles.

Good lapping requires that the neutralised partially esterified carboxylic acid copolymer be dissolved in the aqueous component of the coating composition as opposed to merely being present as a dispersion of solid particles. However, the neutralised copolymer of this invention forms a micellar solution rather than a perfect solution as is evidenced by the fact that the solutions are usually not fully transparent. Instead they scatter light to a small extent and may appear hazy in the absence of organic cosolvent. In practice, the nature of the partially esterified copolymer is generally such that where the copolymer is fully neutralised by sodium cations, it is soluble at least to the extent that a solution comprising 25 wt % anionic moieties derived from the copolymer and 75 wt % of a mixture of equal weights of water and 1-methoxy-2-hydroxy propane (MHP) (where the percentage is based on the combined weights of anionic moiety, water and MHP) should appear clear to the unaided eye after the solution has stood for 48 hours at 20° C. Preferably the partially esterified carboxylic acid copolymer when fully neutralised should be soluble to the extent that the solution comprising 25 wt % of the anionic moieties and 75 wt % of a 4:1 (by weight) mixture of water and MHP should after standing for 48 hours at 20° C. have a nephelometer turbidity reading of less than 80 nephelometer turbidity units (NTU) as measured by the Clarity Assessment Technique hereinafter described. To obtain high degrees of dissolution, it is preferred that enough monovalent cation should be present to neutralise at least 75% (most preferably at least 90%) of the carboxylic acid groups which remain. Usually the copolymer will be fully neutralised. Group 1 metal cations are preferred, especially lithium, sodium or potassium cations. An excess of cations may be present if an alkaline composition is required, however discolouration is minimised if the pH is from 6.5 to 8.0.

It is also important that the neutralised copolymer should form a stable solution. It has been found that if the acid value of the carboxylic acid copolymer before neutralisation falls below 25 mgKOH/g unneutralised copolymer, then the neutralised copolymer will slowly precipitate over a period of several days.

Good lapping combined with short drying times requires the selection of partially esterified copolymers having a particular balance of macromolecular properties and in particular the weight average molecular weight (Mw) of the prepolymer from which the backbone portion is derivable must be less than 30 000 and preferably less than 15 000 but preferably above 3000. It is also preferred that the molecular weight distribution of the prepolymer be such that the ratio Mw/Mn (where Mn is number average molecular weight) be within the range 2 to 4. A suitable molecular weight and molecular weight distribution is best obtained by using an appropriate concentration of copolymerisation initiator of relatively short half-life (measured at 125° C.) when copolymerising the acid and non-acid monomers to make the backbone portion. The half-life should be less than 8 minutes, preferably less than 4 minutes but above 0.1 minutes. Suitable standard initiators include dibenzoyl peroxide, tertiary butyl peroxy-2-ethyl hexanoate and azobis-isobutyronitrile which have half-lives of 2.9, 1.7 and 0.76 minutes respectively at 125° C. The concentrations of alternative initiators appropriate to obtaining a particularly required prepolymer molecular weight vary with the half-life and the molecular weight of the initiator and any chain transfer effect of the copolymerisation solvent. Therefore they are best determined by experiment. However the appropriate concentration for an alternative initiator of known half-life and molecular weight is approximately related to the appropriate concentration for a standard initiator by the following equation:

$$Ia = \frac{Ms \times t\frac{1}{2}s}{Ma \times t\frac{1}{2}a} Is$$

where
Is and Ia are the appropriate concentrations for the standard and the alternative initiators respectively,
Ms and Ma are the molecular weights of the standard and the alternative initiators respectively
and
$t\frac{1}{2}s$ and $t\frac{1}{2}a$ are the half-lives of the standard and the alternative initiators respectively.

Therefore by substituting the concentration of tertiary butyl peroxy-2-ethyl hexanoate used in Examples 1 to 6 which follow into the above equation together with its half-live (1.7 secs) and its molecular weight (258), it is possible to obtain a good indication of the appropriate concentration for an alternative initiator.

The weight average molecular weight of the partially esterified carboxylic acid copolymer (before neutralisation) is preferably from 10 000 to 100 000 when determined by the method hereinafter described. Possibly two or more of the partially esterified copolymers crosslink together. The most preferred range of weight average molecular weights is from 15 000 to 75 000. The full nature of the balance of macromolecular properties is not fully understood, but it has been discovered that the Dynamic Solution Viscosities of unneutralised partially esterified copolymers in 1-methoxy-2-hydroxy propane (MHP) when measured using an oscillatory parallel plate rheometer reliably identify those partially esterified copolymers which are suitable. MHP may be obtained from Dow Chemical Company under the trade name "Dowanol" PM. "Dowanol" PM may contain up to 1 wt % of 1-hydroxy-2-methoxy propane and up to 5 wt % of hygroscopically absorbed water as impurities. These impurities have no significant effects and they are assumed to be non-existant when calculating the amounts of MHP used. If this solution viscosity exceeds 500 Pa.sec, the lapping becomes poor and if it falls below 1 Pa.sec, the coating sags badly when applied to a vertical surface. The preferred range of these viscosities is from 10 to 300 Pa.sec, and most preferably this viscosity does not exceed 230 Pa.sec.

The copolymer is partially esterified by condensing either allyl glycidyl ether which is

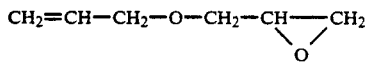

or one of its alkylallyl and/or butyl analogues with some of the carboxylic acid groups via a ring opening of the oxirane ring to provide partially esterified carboxylic acid copolymer as follows:

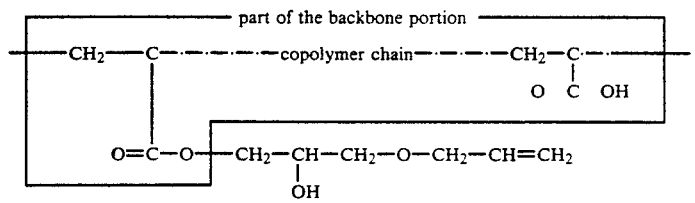

Only some of the acid groups react with the allyl glycidyl ether or its analogues with the result that some acid groups remain to give the partially esterified copolymer its acid value and to be available for neutralisation by the cations. It has been found that (provided suitable driers such as various cobalt compounds are present), 3-allyloxy-2-hydroxypropyl groups or their analogues allow the copolymer to undergo autoxidation as the coating dries in air whilst not creating a need for large amounts of hydrophilic groups to render the copolymer soluble in water. Autoxidation is promoted by the presence of a methylene group flanked by a terminal carbon to carbon double bond and an ether link. Autoxidation is also promoted by the driers such as cobalt octoate, naphthenate or acetate. Autoxidation enables the copolymer macromolecules to crosslink with each other. Crosslinking is necessary for long term water resistance which is poor if the amount of the crosslinkable 3-allyloxy hydroxypropyl moiety or its analogues is below 15 wt % of the weight of the partially esterified carboxylic acid copolymer before neutralisation. Optimum achievement of long term water resistance occurs when the amount of these moieties is from 20 to 38 (preferably 20 to 32) wt % of the weight of the partially esterified carboxylic acid copolymer before neutralisation.

After partial esterification by the 3-allyloxy-2-hydroxypropyl groups or their analogues, the partially esterified copolymer should have enough remaining carboxylic acid groups to give it an acid value of 25 to 60 (preferably 30 to 55) mg KOH/g unneutralised partially esterified copolymer. Too low an acid value will not allow the copolymer to have the ability to be made soluble by neutralisation and too high a value destroys the water resistance of the dried coatings.

The prepolymer is preferably derivable by a copolymerisation of monocarboxylic acid monomer such as acrylic, methacrylic or crotonic acids. Most dicarboxylic systems (for example fumaric acid or maleic anhydride) do not allow the formation of coating compositions with the required solubility in water, however it has been found possible to use itaconic acid. Preferably the copolymerised monocarboxylic acid monomers represent from 20 to 50 mol % (most preferably 20 to 40 mol %) of the prepolymer which in the case of acrylic or methacrylic acids corresponds to about 20 to 50 wt % of the prepolymer before partial esterification. Copolymerised itaconic acid monomers would correspondingly represent 10 to 25 wt % of the prepolymer.

The copolymerised non-acid monomers of the prepolymer are preferably predominantly derived from hydrophobic unsaturated monomers which have solubilities of less than 6 wt % in pure water. Preferably hydrophobic non-acid monomers are of the type conventionally used in making resins for the paint trade. The prepolymer may comprise just one such non-acid monomer such as methyl, ethyl or butyl acrylate but in general it has been found easier to obtain a better balance of properties when a combination of at least two non-acid monomers is used, one of which would give a homopolymer of high glass transition temperature (Tg), for example Tg above 30° C. and one which would give a homopolymer of low Tg, for example Tg below −10° C. Monomers should be chosen which copolymerise at similar rates. Tg is taken, calculated or measured according to the procedures hereinafter described. Examples of non-acid monomers which give homopolymers of high Tg include methyl methacrylate, vinyl acetate and styrene. Examples of non-acid monomers which give homopolymers of low Tg include ethyl acrylate, 2-ethyl hexyl acrylate, methyl acrylate, butyl acrylate and the material commercially available from the Shell Chemical Company under the trade name "Vinyl Versatate" which is believed to be the vinyl ester of a mixture of branched chain acids which acids contain around 10 carbon atoms. 2-ethylhexyl acrylate has the advantage of being less malodorous if present in residual trace amounts in the final coating composition.

Preferably the prepolymer comprises from 0 to 55 (preferably at least 15) mol % of the copolymerised non-acid monomer of the high Tg type and from 10 or more preferably 20 to 70 wt % of the non-acid monomer of the low Tg type. Too much copolymerised monomer of the high Tg type or too little of the low Tg type leads to poorer lapping whereas too much of the low Tg type increases the time needed to achieve touch dryness. The partially esterified copolymer itself before neutralisation should preferably have a Tg of from −10° C. to 15° C. The theoretical Tg (i.e. the Tg as calculated by the Fox equation) of the prepolymer should preferably be much higher than what would normally be found in copolymers selected for use as binders in paints intended for application at ambient temperatures. For example the theoretical Tg will generally be at least 70° C. and preferably from 90° to 130° C. It should be cautioned that in view of the presence of carboxylic acid moieties in the copolymer, the theoretical Tg will differ somewhat from an observed Tg, but nevertheless the theoretical Tg has been found to be useful in identifying suitable prepolymers for this invention.

The carboxyl functional addition prepolymer comprises copolymerized ethylencially unsaturated monomers including carboxyl functional monomers. Polymerizable ethylencially unsaturated monomers contain carbon-to-carbon unsaturation and include vinyl monomers, acrylic monomers, allylic monomers, acrylamide monomers, as well as carboxylic unsaturated acid monomers. Vinyl esters include vinyl acetate, vinyl propionate, vinyl butyrates, vinyl benzoates, vinyl isopropyl acetates and similar vinyl esters; vinyl halides include vinyl chloride, vinyl fluoride, and vinylidene chloride; vinyl aromatic hydrocarbons include styrene, methyl styrenes and similar lower alkyl styrenes, chlorostyrene, vinyl toluene, vinyl naphthalene, and divinyl benzene; and vinyl aliphatic hydrocarbon monomers include alpha olefins such as ethylene, propylene, isobutylene, and cyclohexene as well as conjugated dienes such as 1,3 butadiene, methyl-2-butadiene, 1,3-piperylene, 2,3 dimethyl butadiene, isoprene, cyclohexane, cyclopentadiene, and dicyclopentadiene; vinyl alkyl ethers include methyl vinyl ether, isopropyl vinyl ether, n-butyl vinyl ether, and isobutyl vinyl ether; and n-alkylol amides include acrylamides or methacrylamides such as N-methylol acrylamide, N-ethanol acrylamide, N-propanol acrylamide, N-methylol methacrylamide, N-ethanol methacrylamide, and similar alkyl acrylamide or methacrylamide monomers containing methyl, ethyl, propyl, n-butyl or iso-butyl alkyl groups. Acrylic monomers include monomers such as lower alkyl esters or acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxy alkyl acrylates and methacrylates such as hydroxyethyl and hydroxypropyl acrylates and methacrylates, as well as amino acrylates and methacrylates. Carboxyl functional monomers comprise acrylic acids including acrylic acid, methacrylic acid, ethacrylic acid, and, if desired, itaconic acid.

The prepolymer may comprise up to 10 mol % (preferably up to 5 mol %) of hydrophilic non-acid monomers especially if it is required to adjust the solubility of the ultimate neutralised partially esterified carboxylic acid copolymer. Examples of useful hydrophilic non-acid monomers include hydroxy ethyl acrylate, acrylamide, methacrylamide and the alkoxy (usually $C_1$ to $C_4$ alkoxy) polyethylene glycol methacrylates of various molecular weights. Preferably the hydrophilic non-acid monomers should not be present in amounts which cause the unneutralised partially esterified carboxylic acid copolymer to be significantly soluble in de-mineralised water. More precisely, the unneutralised partially esterified copolymer should always be insoluble to the extent that a solution consisting of 10 wt % unneutralised partially esterified copolymer and 90 wt % water after standing for 48 hours at 20° C. has a nephelometer turbidity reading of at least 80 NTU. Preferably the copolymer should remain permanently substantially insoluble at 20° C. whilst still unneutralised.

The organic cosolvent assists the neutralised partially esterified copolymer to dissolve and it helps to control the viscosity of the coating composition as it dries in air which leads to better application including better lapping. The cosolvent can also improve gloss. The coating composition should contain an effective amount of cosolvent which means as little as possible. Usually at least 2 wt % (based on the weight of water and cosolvent) of organic cosolvent will be necessary. The improvements become less worthwhile with amounts of cosolvent beyond 25 wt %. The preferred range of cosolvent concentrations is from 5 to 15 wt %.

The organic cosolvent should be a water-miscible liquid which plasticises the partially esterified carboxylic acid copolymer and/or otherwise increases its solubility in water when neutralised. The cosolvent preferably has a boiling point of from 75° to 200° C. at 1 bar absolute. An ideal cosolvent should also be odourless and non-toxic and it should have a high flash point (preferably at least 30° C.). It is useful to choose cosolvents which can act as a chain transfer agent during copolymerisation of the acid and non-acid comonomers. Examples of useful cosolvents include alcohols, glycols, ester alcohols, ether alcohols and the esters of ether alcohols for example: n-butanol, 2-pentanol, ethylene or propylene glycol, benzyl alcohol, 2,2,4 trimethylpentane 1,3 diolmonoisobutyrate, ethylene glycol, monopropyl, -butyl and -hexyl ethers, propylene glycol monomethyl, -ethyl, -propyl and -butyl ethers, diethylene glycol, dipropylene glycol, dipropylene glycol methyl ether, diethylene glycol ethyl ether, ethylene glycol monomethyl ether and most preferably propylene glycol monomethyl ether (i.e. 1-methoxy-2-hydroxy propane (MHP).

The coating compositions usually have a total non-volatile content of from 10 to 70 wt % of the composition. Non-volatile content is determined according to the procedure of ASTM Test D 1210-9 performed at 150° C. or 210° C. if the cosolvent has a boiling point above 150° C. The contents of this Test are herein incorporated by reference. The total non-volatile content is generally 30 to 60 wt % for gloss paints, 30 to 70 wt % for partial gloss paints, 10 to 50 wt % for varnishes and 10 to 30 wt % for woodstains and timber preservatives. Depending on the type of coating composition required, from 10 to 100 wt % of the total non-volatile content may consist of the partially esterified carboxylic acid copolymer (weighed before neutralisation). Preferably for loss paints, from 20 to 75 wt % of the total non-volatile content of the composition is partially esterified carboxylic acid copolymer and the corresponding preferred ranges for partial gloss paints, varnishes and woodstain or timber preservative are 10 to 60 wt %, 20 to 100 wt % and 20 to 100 wt % respectively.

It has also been discovered that the gloss of dried coatings obtained from the coating compositions containing at least partially neutralised partially esterified carboxylic acid copolymers can be improved by the inclusion in the composition of particles of insoluble organic polymeric material provided that the number average particle diameter of the particles lies in the range 50 to 2000 nm and preferably within the range 100 to 1000 nm. It is also very much preferred that the particles should be as free as conveniently possible from large particles, that is to say particles having diameters above 3000 nm. Usually less than 5% by number of the particles should be large and if possible less than 2% by number. Very small particles may decrease the ability of the coating compositions to lap whilst very large particles can impair gloss instead of improving it. For these reasons it is especially preferred that the number average particle diameter be within the range 100 to 800 nm.

The dispersion should be stable to the organic cosolvent and in particular co-agulation should not occur on adding to the dispersion enough MHP to give a dispersion comprising 33 wt % dispersed particles and 67 wt % of a mixture of equal weights of water and MHP.

In order to obtain a highly stable aqueous dispersion of the particles of the insoluble solid material in the presence of the preferred cosolvents, it is necessary to chemically bond the material to molecules containing a hydrophilic moiety capable of at least helping to keep the particles dispersed. Such hydrophilic molecules should be non-ionic and should each contain a hydrophilic moiety and a moiety which bonds to the particulate material. Accordingly this invention also provides water-based autoxidisable air-drying coating composition suitable for application at ambient temperatures which comprises a) water,
b) preferably a minor amount of organic cosolvent (preferably 2 to 50 wt % based on the weight of water and cosolvent),
c) autoxidisable carboxylic acid copolymer at least partially neutralised by monovalent cations and
d) dispersed particles of insoluble solid organic polymeric material having number average particle diameter of from 50 to 2000 nm wherein the insoluble solid material is chemically bonded to hydrophilic molecules which at least help the particles to form a stable dispersion in the coating composition and which hydrophilic molecules each contain a hydrophilic moiety and a moiety which is bonded to the organic polymeric material. A preferred chemical bonding technique comprises choosing a copolymerisable non-ionic hydrophilic molecule which can be chemically bonded into the organic polymeric material by copolymerisation with other monomers of the organic polymer. In effect this means that the hydrophilic molecule should comprise both a hydrophilic moiety and a polymerisable moiety. Preferred polymerisable moieties comprise carbon to carbon double bonds such as allylic, acrylate or methacrylate groups.

Preferred hydrophilic groups include chains of poly(vinyl pyrollidone), chains of polyoxazoline, chains of polyamides especially polymethacrylamide or chains of poly(ethylene oxide) usually containing from 20 to 45 interconnected ethylene oxide molecules, such as those found in methoxy polyethylene glycol methacrylates and the reaction product of pentaerythritol triallyl ether, butylene oxide and ethylene oxide made according to the procedure of Example 1 of European Patent Specification EP 0 094 386B, the contents of which are herein incorporated by reference. The reaction product is believed to have the formula:

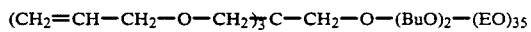

where $(BuO)_2$ is a chain containing two interconnected butylene oxide molecules and $(EO)_{35}$ is a chain containing 35 interconnected ethylene oxide molecules. The number average molecular weight of the hydrophilic molecule is preferably from 1500 to 3000.

The insoluble material to which the hydrophilic molecules are bonded and from which the particles are formed is an organic polymeric material which is not dissolved by the liquid component of the coating compositions. It is preferred to choose polymeric materials which are conventionally used by the paint trade. These are reviewed in Chapters 11 and 12 of the third edition of the book "Introduction to Paint Chemistry and Principles of Paint Technology" by G P A Turner and published in 1988 by Chapman and Hall of London. The contents of these chapters are herein incorporated by reference. Examples of useful polymeric (including copolymeric) materials are the condensates such a polyamides, polyesters and alkyd resins or the addition polymers made by polymerising or copolymerising monomers containing carbon to carbon double bonds such as styrene, vinyl toluene, ethylene, propylene, butylene or preferably less hydrophobic comonomers such as vinyl esters of saturated carboxylic acids and the so called vinyl "Versatate", and unsaturated carboxylic acids such as acrylic, methacrylic, itaconic, crotonic, fumaric or maleic acids or their $C_1$ to $C_4$ esters. Useful insoluble particles include the usually opaque polymer particles each containing one or more voids such as those described in European Patent Specification EP 0 113 435B (the contents of which are herein incorporated by reference) and which are commercially available under the trade name "Ropaque".

Preferably the coating compositions comprise from 10 to 50 wt % of the insoluble solid particles where the percentage is based on the combined weights of the particles and the autoxidisable carboxylic acid copolymer before neutralisation. In general the polymer of the insoluble solid particles will have a weight average molecular weight of at least 30 000 and it will be solid at ambient temperatures. The Tg of the polymers will usually be less than 110° C. to avoid excessive embrittlement. The polymers may be film-forming or non-film-forming.

The coating compositions may additionally contain components conventionally used in making for example paints, varnishes, woodstains or timber preservatives. Such components include pigments, dyes, extenders, thickeners, fungicides, anti-skinning agents, flow improvers and drying agents. The coating compositions have also been found to have a good ability to soak into wood and so they are useful as woodstains and timber preservatives.

The various measurement and assessment techniques referred to in this specification are defined as follows:

Clarity/Turbidity Assessment Technique

The clarities or turbidities of solutions of salts of a fully neutralised partially esterified carboxylic acid copolymer in a 4:1 (by weight) mixture of water and 1-methoxy-2-hydroxy propane (MHP) were assessed using a nephelometer.

A nephelometer is an instrument designed to compare the light scattering ability of particles suspended in a liquid relative to the corresponding ability of a standard liquid containing no particles. The nephelometer shines a horizontal beam of light through a sample under test and measures the amount of light scattered by the sample in a horizontal direction perpendicular to the beam. The extra amount of light scattered by the test sample relative to the standard is given in nephelometer turbidity units (NTU). The smaller the reading in NTU, the less is the turbidity and hence the greater is the clarity of the solution.

For the purposes of this specification, the nephelometer used was Model 40-005 supplied by Turner Designs of Mount View, Calif., USA and it is described in their brochure "Clear Water: Turbidity Nephelometry" Form 40-480, the contents of which are herein incorporated by reference. The standard chosen was the 4:1 water/MHP mixture mentioned above for which the nephelometer was set to give a reading of 0.5 NTU at 20° C. when operating in its ×10 mode. The measurement procedure used was as follows:

A solution of a salt of a fully neutralised partially esterified carboxylic acid copolymer was obtained which comprised of 25 wt % anionic moieties of the salt and 75 wt % of the 4:1 (by weight) mixture of water and MHP where percentages are based on the combined weights in the solution of anionic moieties of the salt, water and MHP. A 20 ml sample of the solution was taken and maintained at 20° C. for 48 hours and then its turbidity was measured on the nephelometer relative to the 4:1 water/MHP standard.

Cone and Plate Viscosity

Cone and Plate Viscosity a 25° C. is measured according to the technique described by C. J. H. Monk in the "Journal of the Oil and Colour Chemists Association" 1966 Volume 49 pages 543 to 550, the contents of which are herein incorporated by reference.

Discolouration (Yellowing) Test:

The discolouration or yellowing of a coating on ageing is assessed using spectrophotometry as follows:

A coating 100 μm thick was applied to a glass sheet and allowed to dry at 20° C. Using CIELAB 1931 Illuminant C (Northern Daylight), the reflectance of the coating at 20 nm intervals from 400 to 700 nm was measured and used to calculate a B (yellowing) value in accordance with the CIELAB system. The coating was then subjected to simulated ageing by storing it for 30 days in air and in the dark at 40° C. after which it was allowed to cool to 20° C. The reflectance measurements were repeated and again used to calculate the CIELAB B value. The difference between the B values before and after ageing is a measure of the amount of yellowing which has occurred.

Dynamic Solution Viscosity Measurement Technique:

The Dynamic Solution Viscosities of the solutions of unneutralised partially esterified carboxylic acid copolymer in 1-methoxy-2-hydroxy propane (MHP) were measured using an oscillatory parallel plate rheometer.

An oscillatory parallel plate rheometer consists of a rotatably oscillatable horizontal circular base plate spaced below a parallel circular top plate mounted on a torque bar. In use the space between the plates is filled by the sample to be measured and the base plate is made to oscillate with a pre-determined amplitude of strain at a suitably high frequency. The sample viscoelastically couples the plates so that the oscillation of the base plate imposes a torque on the top plate. This imposed torque is balanced by an opposing torque applied to the top plate by the torque bar so as to keep the top plate stationary. The frequency of oscillation is gradually reduced. The applied torque needed to keep the top plate stationary also reduces with the reducing frequency of oscillation until eventually at lower frequencies it becomes constant. This constant value is a function of the dynamic viscosity of the sample and the geometry of the rheometer. Hence the rheometer can be calibrated to read Dynamic Solution Viscosity directly.

For the purposes of this specification, the rheometer used is a Bohlin VOR rheometer supplied by Bohlin Reologi of Lund in Sweden and described in their brochure "The Bohlin VOR Rheometer" the contents of which are herein incorporated by reference. The plates used were 30 mm in diameter, spaced 1 mm apart and made from stainless steel. A 93.2 g cm torque bar was used together with a strain amplitude of 0.05 and a frequency range of from 20 to 0.01 Hertz. The measurement was done as follows:

Unneutralised partially esterified carboxylic acid copolymer was obtained as a solution in MHP which solution consisted of 90 wt % unneutralised partially esterified carboxylic acid copolymer and 10 wt % MHP. The solution was introduced between the plates of the rheometer and heated to 60° C. It was maintained at that temperature throughout the measurement operation.

Epoxide Value Measurement Technique

The epoxide value of a grafted copolymer is determined by adding crystal violet indicator to a sample of the copolymer dissolved in glacial acetic acid and then titrating the solution against 0.1M perchloric acid until the indicator turns from violet to yellow. Epoxide value is expressed as:

$$\frac{5.61 \times V}{W}$$

where V is the volume of perchloric acid used and W is the weight of grafted copolymer originally in the solution.

Lapping Test

Firstly a test surface is prepared by coating a rectangular sheet of hardboard 600 mm long by 300 mm wide with a coat of a conventional water-based white acrylic primer undercoat available as "Dulux" White Quick-Drying Wood Primer Undercoat from the Paints Division of Imperial Chemical Industries PLC (ICI). The undercoat is allowed to dry for at least 24 hours and then there is applied to it 2-coats of a conventional white spirit-based white alkyd gloss paint also available from ICI as "Dulux" Brilliant White Gloss. The top coat is allowed to dry and age for at least 7 days to produce the test surface on which the lapping tests can be performed. The tests are performed at a temperature of from 20° to 23° C. and at a relative humidity of from 40 to 60%.

The lapping test is performed by first using a conventional block spreader of designated film thickness 100 μm to apply a longitudinal band of the paint under test to the test surface. The band is 50 mm wide and 600 mm long and is applied parallel to and equidistantly between the two 600 mm edges of the hardboard. Two minutes later a first transverse band of the paint under test is applied to the test surface so that it extends from one long edge of the hardboard sheet to the other running parallel to the short edges and crossing over the longitudinal band. The transverse band is applied by means of 3 back and forth return strokes of a conventional 50 mm wide bristle paint brush. Six further transverse bands are similarly applied at two minutes intervals parallel to but spaced from the first transverse band and the bands are allowed to dry for at least 4 hours. The crossing zones where the transverse bands cross over the longitudinal band are then examined by the unaided eye. Where an upper (transverse) band has lapped poorly with the lower (longitudinal) band, the upper band will exhibit lines above and parallel to the edges of the lower band indicating that the two bands of paint have not lapped or merged together properly. In contrast, an excellently lapping paint such as a white spirit solvent-based alkyd gloss paint will not exhibit such lines until the intervaL between the application of the longitudinal band and a transverse band exceeds 10 minutes. A good lapping water-based gloss paint should not exhibit such lines until the interval exceeds 8 minutes.

Molecular Weight Measurement

Both weight average and number average molecular weights are measured by making a solution consisting of 0.5 wt % copolymer in 99.5 wt % tetrahydrofuran and subjecting the solution to gel permeation chromatography using a pair of 300 mm linear columns arranged in series and packed with 5 micron polystyrene gel supplied by Polymer Laboratories Ltd of Church Stretton, England. The results obtained are calibrated against a polystyrene standard.

Particle Diameter Measurement

Number average particle diameter is measured by photon correlation spectroscopy using a Coulter nanosizer as supplied by Coulter Limited of Luton, England.

Solution Stability Assessment

A solution comprising 33 wt % of anionic moieties of a salt of a fully neutralised partially esterified carboxylic acid copolymer and 67 wt % of a 3:1 (by weight) mixture of water and MHP was allowed to stand for 10 days in an incubator maintained at 40° C. The solution was then examined by the unaided eye to see whether any precipitation had occurred.

Tg Determination

For the purposes of this specification, the Tg of a homopolymer is taken from Table 14 in the article "Concepts Involved in Designing Acrylic Compolymers in Solution" by D H Klein published in the "Journal of Paint Technology" Volume 42 No. 545 of June 1970, see pages 335 to 351, the contents of which are herein incorporated by reference. If the homopolymer is one which is not present in Klein's Table 14, then its Tg is taken from pages 143 to 192 (the contents of which are herein incorporated by reference) of Part III of the second edition of the "Polymer Handbook" edited by J Brandrup and E H Immergut and published in 1975 by John Wiley & Sons of New York. If the homopolymer is not present in Klein's Table 14 and the "Polymer Handbook", then its Tg is determined by compensation differential scanning calorimetry as described on pages 4 to 9 of the book "Thermal Characteristics of Polymeric Materials" edited by E A Turi and published in 1981 by Academic Press INC (London) Ltd, the contents of which pages are herein incorporated by reference. The calorimetry should be performed on samples which have been heated isothermally at 100° C. for 15 minutes. It should be mentioned however, that measurements of Tg are seldom accurate to more than $+/-5°$ C.

The Tg of the unneutralised copolymer and other copolymers is calculated using the Fox equation employing values for homopolymer Tg which are determined as above.

Touch Dry Time Measurement

The time taken for a freshly applied coating to become dry to touch is measured by a sand deposition procedure as follows:

A coating 50 to 60 μm thick is applied at 20° C. and 50% relative humidity to a horizontal planar dry coat of conventional liquid gloss alkyd paint (such as "Dulux" brilliant white liquid gloss) after the coat had been allowed to dry at 20° C. and 50% relative humidity for at least 7 days. The coating is maintained at 20° C. throughout the measurement procedure. A hopper having a small outlet in its base is filled with sand which then trickles through the outlet. The hopper is caused to traverse the coating at a speed of 25.4 mm/hour with sand trickling onto the coating. Initially the sand sticks to the coating which is still wet but as time passes, the coating dries and there comes a point when the sand ceases to stick to it. The time taken to reach this point is regarded as the touch dry time for the purposes of this specification. The point is easily detected by blowing the loose sand from the fully dried coating so as to leave a trail of stuck sand of a length from which the touch dry time is calculated by dividing by the speed of traverse.

"Dulux" brilliant white liquid gloss alkyd paint is available from the Paints Division of Imperial Chemical Industries Plc of Slough England.

Water Spot Resistance Test

The resistance of a freshly applied coating to disfiguration by water is assessed as follows:

Method A

A coating 50 to 60 μm thick is applied to a dry coat of a conventional alkyd paint obtained as in the touch dry test above. The coating is allowed to dry for 24 hours at 20° C. and 50% relative humidity. Then a 1 ml drop of water is deposited onto it. The drop is removed after 15 minutes and the coating is examined for disfiguration.

Method B

The procedure of Method A is followed up till and including the deposition of the drop of water. However when the drop has been deposited, it is covered by a watch glass and sample under test is allowed to stand at 20° C. for two hours. Then the glass is removed and the sample is immediately wiped dry and examined for disfiguration.

The invention is further illustrated by the following Examples of which Examples A to I are comparative.

EXAMPLES 1 TO 6 AND COMPARATIVE EXAMPLE A

Preparation of Partially Esterified Carboxylic Acid Copolymers and Water-based Coating Composition containing the neutralised Copolymers Firstly a prepolymer from which the backbone portion of the partially esterified copolymer could be derived was made by copolymerising acrylic acid monomer and various non-acid monomers in 1-methoxy-2-hydroxy propane (MHP). This was done by taking an amount of MHP equal to either 25% (Examples 1, 3 to 5 and A) or 40% (Examples 2 and 6) of the combined weights of the acid and non-acid monomers and heating it under reflux to 120° to 130° C. A mixture of the monomers plus 5 wt % (based on the weight of the monomers) of a free radical polymerisation initiator which was tertiary butyl peroxy-2-ethyl hexanoate (half-life at 125° C. is 1.7 min and the concentration was 5 g/liter) was added to the refluxing MHP over a period of 3 hours during which time copolymerisation occurred producing a solution in MHP of prepolymer containing carboxylic acid groups. Refluxing was continued for an extra 15 minutes and then a further 1 wt % (concentration 1 g/liter) of initiator was added over a period of 1 hour to ensure completion of the copolymerisation. The solution was then allowed to cool to room temperature. The Dynamic Solution Viscosities of the ultimate partially esterified copolymers (see Table 2) indicate that the prepolymers produced in Examples 1 to 6 had weight average molecular weights of below 15 000 and molecular weight distributions within the range 2 to 4.

The solution was re-heated under reflux to 90° to 95° C. and then allyl glycidyl ether and 1.5 wt % (based on the weight of the ether) of 40 wt % solution in water of an oxirane-ring opening catalyst (which was benzyl trimethyl ammonium hydroxide) was added dropwise over a period of 5 minutes. The solution was then heated to 115° to 125° C. under reflux whereupon the allyl glycidyl ether partially esterified the prepolymer by undergoing a condensation reaction with some of its carboxylic acid groups. Accordingly this condensation reaction created a solution of a film-forming partially esterified carboxylic acid copolymer in MHP in which the backbone portion of the partially esterified copolymer had been derived from the prepolymer. Heating under reflux was continued until the epoxide value of the solution had fallen to below 5 mg KOH/g non-volatile contents of the solution and then the solution was allowed to cool to room temperature.

The amounts of acrylic acid, non-acid monomer and allyl gylcidyl ether used were chosen so as to produce unneutralised partially esterified carboxylic acid copolymers having a Tg of about −3° C. and also having the molar and weight percentage compositions, acid values and weight average molecular weights shown in Table 1. The weight percentage of the added allyl glycidyl moieties is based on the weight of the partially esterified carboxylic acid copolymer before neutralisation.

A small sample of the solution of partially esterified carboxylic acid copolymer was taken and MHP was removed by distillation at 1 bar absolute to produce a more concentrated solution consisting of 90 wt % of the copolymer and 10 wt % MHP. The Dynamic Solution Viscosity of the solution was measured by the technique hereinbefore described and the results are shown in Table 2.

The remainder of the solution of partially esterified carboxylic acid copolymer was neutralised using just sufficient aqueous sodium hydroxide to neutralise all the remaining carboxylic acid groups so producing a fully neutralised water-based solution of the sodium salt of the partially esterified carboxylic acid copolymer.

A portion of the above neutralised solution was taken and water and MHP were added to it to produce a water-based coating composition comprising of 25 wt % anionic moieties of the salt and 75 wt % of a 4:1 (by weight) mixture of water and MHP, the percentages being based on the combined weights of the anionic moieties, water and MHP. The clarity/turbidity was assessed by measuring its turbidity according to the Clarity Assessment Technique hereinbefore described. The results are shown in Table 2.

A further portion of the neutralised solution was taken and water and MHP were added to it to produce a water-based solution this time comprising 50 wt % of anionic moieties and 50 wt % of a mixture of equal weights of water and MHP. Cobalt octoate was added to the solution (0.2 wt % of cobalt metal based on the weight of the neutralised copolymer anionic moieties) and then the solution was divided into four sub-portions, three of which were used respectively to determine touch dry time, water spot resistance (Method A) and discolouration on ageing using the techniques and procedures hereinbefore described. The results are shown in Table 2. These water-based solutions all lap well at 8 minutes. The fourth portion made according to Example 2 was converted to a Test Paint as follows:

The solution was added to a mixing vessel followed by sufficient pigment grade rutile titanium dioxide to ensure that the titanium dioxide comprised 15% of the total volume of the ultimate Test Paint. The contents of the vessel were subjected to high speed stirring for 15 minutes using a stirrer rotating at not less than 1700 revolutions per minute. After stirring, the mixture was allowed to stand overnight and then used as the Test Paint the following day. The Test Paint was subjected to the Lapping Test and found to be capable of lapping at least 8 minutes after application. Similar results are obtainable with the solutions obtained from Examples 1 and 3 to 6.

The prepolymer was partially esterified by adding 38.2 g of allyl glycidyl ether, 0.4 g triethylamine (esterification catalyst) and 0.012 g 4-methoxy phenol (oxidation inhibitor) to 248 g of the diluted prepolymer solution contained in a stirred flask and then heating the mixture to 115° C. under nitrogen for 5 hours. This produced a partially esterified carboxylic acid copolymer having a backbone portion derived from the prepolymer. The acid value of the copolymer was 72.8 mgKOH/g. Next, solvent was removed using Dean and Stark distillation apparatus to produce a concentrate containing 80 wt % non-volatiles. 77 g of the concentrate was diluted with 9.7 g of ethylene glycol monobutyl ether to give a solution containing 65 wt % non-volatiles. 86 g of this solution was then neutralised using 8.2 g aqueous solution of ammonium hydroxide containing 25 wt % of ammonia and the neutralised solution was diluted with water to give solution containing 25 wt % non-volatiles in which 80% of the carboxylic acid groups were neutralised. Finally 0.31 g of an aqueous solution containing 18.2 wt % cobalt acetate (autoxidation catalyst) was added to 100 g of the 25 wt % neutralised solution to produce an autoxidisable varnish.

The varnish was subjected to the Lapping Test and was found to be incapable of lapping after not more than 2 minutes. (In fact observations made during performance of the Test indicated that the varnish had ceased to be lappable after only one minute). Accordingly the varnish was unsuitable for use as an air-drying coating composition. The partially esterified copolymer was also found to have a Cone and Plate viscosity of 37.5 poise which means that its dynamic solution viscosity in MHP of was well above 500 Pa.sec. Such a viscosity was too high to permit the formulation of paints of commercially acceptably high non-volatiles content quite apart from the fact that the paints would be unlappable.

In contrast the backbone portion of a partially esterified carboxylic acid copolymer made broadly according to Example 2 had an Mw of 10 000, an Mn of 4 300 and an Mw/Mn ratio of 2.8 and was found to have a lapping time of at least 8 minutes. The partially esterified copolymer made broadly according to Example 2 differed from that of Example 2 in that it had a weight average molecular weight of 29 400 and a dynamic solution viscosity in MHP somewhere between 45 and 175 Pa.sec.

TABLE 1
PARTIALLY ESTERIFIED CARBOXYLIC ACID COPOLYMER

| Example | Mol % AA | Mol % copolymerised non-acid Monomer | | | | | | | Acid Value | Wt Av Mol Wt Part. Est. copol. |
|---|---|---|---|---|---|---|---|---|---|---|
| | | EA | MMA | BA | MMMA | MEA | Sty | *3AHP | | |
| 1 | 29.5 | 24.5 | 24.5 | — | — | — | — | 21.5 | 33.8 | 63 000 |
| 2 | 29.5 | 24.5 | 24.5 | — | — | — | — | 21.5 | 33.3 | 18 500 |
| 3 | 30.5 | — | 24.5 | 21.9 | — | — | — | 22.2 | 33.8 | 53 000 |
| 4 | 30.0 | 24.9 | 22.5 | — | 0.8 | — | — | 21.8 | 34.3 | 36 000 |
| 5 | 28.5 | 28.5 | 17.8 | — | — | 4.6 | — | 20.6 | 29.6 | 57 000 |
| 6 | 29.6 | 24.6 | 18.4 | — | — | — | 5.9 | 21.5 | 37.1 | 57 000 |
| A | 29.4 | — | 49.1 | — | — | — | — | 19.8 | 45.2 | 25 000 |

*In all cases the wt % of 3AHP (based on the total weight of unneutralised copolymer) was 28.5. Acid value is quoted in mg KOH/g unneutralised partially esterified carboxylic acid copolymer
3AHP 3-allyloxy-2,2hydroxypropyl moiety
AA Acrylic Acid
EA Ethyl Acrylate
MMA Methyl Methacrylate
MMMA Methoxy polyethylene glycol methacrylate of molecular weight 350.
BA Butyl Acrylate
MEA Methoxy ethyl acrylate

TABLE 2
PARTIALLY ESTERIFIED CARBOXYLIC ACID COPOLYMER

| Example | Viscosity Pa. sec | Clarity/ Turbidity NTU | Sand Dry Times hours | Change in CIELAB B Value | Water Spot Resistance |
|---|---|---|---|---|---|
| 1 | 175 | 52.2 | 2 | 2.8 | Acceptable |
| 2 | 45 | 16.1 | 2.25 | 3.0 | Acceptable |
| 3 | 88 | 21.7 | 2.5 | 3.2 | Better |
| 4 | 45 | 40.6 | 3.75 | 3.3 | Better |
| 5 | 48 | 62.8 | 2.25 | 3.1 | Better |
| 6 | 11 | 18.1 | 2.25 | 2.1 | Acceptable |
| *A | 925 | — | — | — | — |

*Would not lap

COMPARATIVE EXAMPLE B

Importance of Using a Prepolymer of Low Weight Average Molecular Weight

A water-based coating composition containing neutralised partially esterified carboxylic acid copolymer comprising 26.3 mol % acrylic acid, 37.8 mol % ethyl acrylate, 18.9 mol % methyl methacrylate and 17.0 mol % 3-allyloxy-2-hydroxypropyl moiety having an acid value of 73 g KOH/g unneutralised partially esterified copolymer and a weight average molecular weight of 91 300 was made as follows:

A mixture consisting of 150.2 g acrylic acid, 300.2 g ethyl acrylate and 150.2 g methyl methacrylate was added together with 3 g ditertiary butyl peroxide (half-life at 125° C. of 183 minutes) over a period of two hours to 600 g of n-butanol refluxing in a stirred flask at 115° to 120° C. Refluxing at this temperature was continued for a further 4 hours to produce a prepolymer from which the backbone portion of the ultimate partially esterified copolymer could be derived. The prepolymer had a high weight average molecular weight, (Mw) of 78 000, a high number average molecular weight, (Mn) of 16 000 and a high Mw/Mn ratio of 4.9. 300 g of this prepolymer solution were then taken and diluted by addition of 75 g n-butanol to produce a diluted solution containing 40 wt % of the prepolymer.

EXAMPLES 7 TO 10 AND COMPARATIVE EXAMPLES C TO E

Preparation of Coating Compositions comprising salts made from partially esterified Carboxylic Acid Copolymer of Widely Varying Acid Values Coating compositions were made up using the general technique employed for Examples 1 to 6 except that the ring opening catalyst was a proprietry chromium complex supplied as "Cordova Accelerator AMC-2" by Cordova Chemi and Sacremento Calif. The proportions of acid monomer, non-acid monomer and allyl glycidyl ether used were chosen to give unneutralised partially esterified copolymers having a Tg of about −3° C. and containing 10 mol % ethyl acrylate and 34 wt % (25 mol %) 3-allyloxy-2-hydroxy propyl moieties. The molar ratio of acrylic acid and methyl methacrylate was varied as shown in Table 3 to vary the acid value of the partially esterified copolymer whilst maintaining its Tg at about −3° C. The viscosities the partially esterified copolymers made according to Examples 7 to 10 indicated that backbone portions had been derived from prepolymers having had a weight average molecular weight of below 15 000 and a molecular weight distribution within the range 2 to 4.

Just enough of an aqueous solution of lithium hydroxide was added to neutralise all the carboxylic acid groups remaining in the copolymer after partial esterification and then water and MHP were added together with 0.2 wt % cobalt metal (as cobalt octoate based on the weight of the neutralised copolymer) to produce a coating composition comprising of 25 wt % anionic moieties of the lithium salt and 75 wt % of a 4:1 (by weight) mixture of water and MHP. The coating compositions were each in turn subjected to the Solution Stability and Water Resistance Assessments (Method A) and the results are shown in Table 3.

TABLE 3

PARTIALLY ESTERIFIED COPOLYMERS OF VARYING ACID VALUE

| Example | Acid Value | Copolymer Composition mol % Wt % EA 10 mol %, 3AHP 25 mol % (34 wt %) | | Water Spot Resistance | Solution Stability |
|---|---|---|---|---|---|
| | | AA mol % | MMA mol % | | |
| C | 66 | 39 | 26 | Shrivelled & Film Failure | Stable |
| 7 | 46 | 36 | 29 | Good | Stable |
| 8 | 37 | 35 | 30 | Good | Stable |
| 9 | 30 | 34 | 31 | Very Good | Stable |
| 10 | 26 | 32 | 33 | Very Good | Stable |
| D | 17 | 31 | 34 | — | Precipitated |
| E | 11 | 29 | 36 | — | Precipitated |

Acid value is quoted in mg KOH/g unneutralised partially esterified carboxylic acid copolymer.

It will be seen from Table 3 that coating compositions containing the lithium salt made from partially esterified carboxylic acid copolymers having acid values in excess of 60 mg KOH/g unneutralised copolymer were unacceptably sensitive to water whilst those made for copolymers having acid values below 25 did not have long term solution stability.

EXAMPLES 11 TO 16 AND COMPARATIVE EXAMPLES F TO H

Preparation of Coating Compositions comprising salts of partially esterified Carboxylic Acid Copolymers containing Varying Amounts of 3-allyloxy-2-hydroxy propyl Moiety Coating compositions were made according to the general procedure used for Examples 7 to 10. The proportions of acid monomer, non-acid monomer and allyl glycidyl ether used were chosen to give copolymers as specified in Table 4. Just sufficient aqueous sodium or lithium hydroxide was used to neutralise all the carboxylic acid groups remaining after partial esterification of the copolymer and then further water and MHP were added together with 0.2 wt % cobalt metal (as cobalt octoate and based on the weight of the neutralised copolymer) to produce a coating composition comprising 35 wt % anionic moieties of the salt and 65 wt % of a mixture consisting of equal weights of water and MHP. The solutions were examined by the unaided eye and the results are shown in Table 4 from which it will be seen that the amount of 3-allyloxy-2-hydroxy propyl moiety should not fall to 14 wt % or rise to 40 wt %. The preferred amounts are from 20 to 30 wt %.

TABLE 4

PARTIALLY ESTERIFIED COPOLYMER WITH VARYING AMOUNTS 3 AHP

| Example | Copolymer Composition | | | | Acid Value | Cation | Water Spot Resistance |
|---|---|---|---|---|---|---|---|
| | Wt % 3AHP | Mol % AA | EA | MMA | | | |
| F | 11 | 15 | 56 | 20 | 30 | Na | *None |
| G | 14 | 17 | 50 | 21 | 33 | Na | **Poor |
| 11 | 17 | 19 | 45 | 21 | 36 | Na | Acceptable |
| 12 | 20 | 22 | 40 | 22 | 34 | Na | Better |
| 13 | 23 | 24 | 34 | 22 | 35 | Na | Better |
| 14 | 26 | 26 | 29 | 23 | 37 | Na | Better |
| 15 | 29 | 29 | 24 | 24 | 35 | Na | Better |
| 16 | 34 | 35 | 10 | 30 | 36 | Li | Acceptable |
| H | 40 | 39 | — | 31 | 48 | Li | ***Poor |

Acid Value is quoted in mg KOH/g unneutralised partially esterified carboxylic acid copolymer
*Film totally dissolved
**Almost total dissolution
***Film shrivelled

EXAMPLES 17 TO 19

Illustration of the Improved Gloss obtainable by Addition of Particulate Insoluble Solid Material Stable dispersions of insoluble organic polymeric material were made up for use in Examples 18 and 19.

Preparation of a Dispersion of Particles for use in Example 18

The following charges were made up:

| Charge A | |
|---|---|
| Water | 530 g |
| "Levalan" 208 surfactant as a solution consisting of 80 wt % surfactant and 20 wt % water | 7.5 g |
| Borax | 3.8 g |
| Charge B | |
| Methyl methacrylate | 34.5 g |
| Butyl acrylate | 27.5 g |
| Charge C | |
| Water | 6.75 g |
| Tertiary butyl hydroperoxide | 0.24 g |
| Charge D | |

| -continued | |
|---|---|
| Water | 12.0 g |
| Sodium metabisulphite | 0.5 g |
| Charge E | |
| Water | 6.0 g |
| Sodium metabisulphite | 0.24 g |
| Charge F | |
| Water | 6.8 g |
| Ammonium persulphate | 1.35 g |
| Charge G | |
| Methyl methacrylate | 320 g |
| Butyl acrylate | 256 g |
| Surfactant as in Charge A | 9.7 g |
| *Hydrophilic compound | 32 g |
| Charge H | |
| Water | 38.3 g |
| Sodium Metabisulphite | 1.5 g |
| Charge I | |
| Water | 5.4 g |
| Ammonium persulphate | 0.7 |
| Charge J | |
| Water | 19 g |
| Sodium metabisulphite | 0.76 g |

*The hydrophilic compound was the reaction product of pentaerythritol triallyl ether, butylene oxide and ethylene oxide reacted in the molar ratio 1:2:35 as described in EP 0 094 386B.

Charge A was poured into a 2 liter flask fitted with a reflux condensor followed by Charges B and C in turn. The mixture obtained was warmed to 50° C. and stirred for 15 minutes to emulsify the acrylic monomers. Charge D was added followed 10 minutes later by Charge E. Stirring was continued for twenty minutes during which time a seed polymer was formed consisting of particles of number average diameter 70 nm.

The flask was heated to 60° C. and Charge F was added. Next Charges G and H were added dropwise and concurrently over a period of 150 minutes. Stirring was continued for a further 10 minutes and then Charge I was added followed immediately by dropwise addition of Charge J over 30 minutes. Finally stirring was continued for a further 30 minutes whereafter there was obtained a stable colloidal dispersion of pH 6.9 containing 52 wt % of solid particles of number average diameter 162 nm. This dispersion was subsequently used to make up a paint for the purposes of Example 18.

The particles were particles of an organic polymer comprising 52.9 wt % methyl methacrylate, 42.3 wt % butyl acrylate and 4.8 wt % hydrophilic moiety which copolymer had a Tg of 11° C. and an indeterminate molecular weight owing to the presence of crosslinking. The dispersion was very stable in the presence of organic cosolvent and in particular it did not coagulate when mixed with MHP to produce a second dispersion containing 33 wt % particles in a mixture of equal weights of water and MHP.

Preparation of a Dispersion of Particles for use in Example 19

The following charges were made up:

| Charge K | |
|---|---|
| Distilled Water | 939 g |
| Ethanol | 833 g |
| Methoxy*poly(ethylene glycol) methacrylate (MeOPeGMA) as a solution of 30 wt % MeOPeGMA in a 4:1 (by weight) mixture of ethanol and water | 166 g |
| Charge L | |
| Methyl methacrylate | 57.5 g |
| 2-ethyl hexyl acrylate | 67.5 g |

| -continued | |
|---|---|
| Azobis-isobutyronitrile | 2.5 g |
| Charge M | |
| Methyl methacrylate | 457 g |
| 2-ethyl hexyl acrylate | 536 g |
| MeOPeGMA | 46 g |
| Ethanol | 37 g |
| Azobis-isobutyronitrile | 14.4 g |
| Charge N | |
| Methyl methacrylate | 152 g |
| 2-ethyl hexyl acrylate | 179 g |
| Azobis-isobutyronitrile | 4.8 g |

*The poly(ethylene glycol) chains had a number average molecular weight of 2000

Charge K was poured into a 3 liter flask fitted with a reflux and the mixture obtained was stirred and heated to 81° C. Charge L was added and stirring and heating under reflux was continued for 30 minutes during which time a seed polymer was formed of number average particle size 95 nm.

Next, Charge M was added to the returning condensed ethanol dropwise over a period of 3 hours followed by the dropwise addition over 1 hour of Charge N. Heating to 81° C. and stirring were continued for a further 30 minutes. 10 g of the liquid returning from the condensor to the flask were removed and used to dissolve a further 3 g of azo-isobutyronitrile. The solution obtained was added to the flask whereafter heating and stirring was continued for a further 30 minutes. Lastly, enough ethanol was distilled off to give a dispersion of pH 6.9 containing 51 wt % of solid particles of number average diameter 231 nm. This dispersion was subsequently used to make up a paint for the purposes of Example 19.

The particles were particles of a copolymer comprising 43.2 wt % methyl methacrylate, 50.7 wt % 2-ethylhexyl acrylate and 6.2 wt % MeOPeGMA which copolymer has a Tg of −15° C. and a weight average molecular weight of 68,000. The dispersion was very stable in the presence of organic cosolvent and in particular it did not coagulate when mixed with MHP to produce a second dispersion containing 33 wt % particles in a mixture of equal weights of water and MHP.

Preparation of Paints for Examples 17, 18 and 19

The following charges were made up:

Charge O

A solution consisting of 42.5 wt % MHP solvent and 57.5 wt % of an neutralised partially esterified carboxylic acid copolymer made according to the procedure of Example 2.

Charge P

A blend consisting of 51 g of Charge O and 41 g of the dispersion of particles made for use in Example 18.

Charge Q

A blend consisting of 51 g of Charge O and 41 g of the dispersion of particles made for use in Example 19.

61.5 g of titanium dioxide pigment were added to 60 g of Charge O and subjected to high speed stirring to produce a millbase of particles of titanium dioxide in the solution of neutralised partially esterified carboxylic acid copolymer in MHP. This procedure was done three times to produce three millbases, one for use in each of Examples 17, 18 and 19. In Example 17, the millbase was mixed with a further 51 g of Charge O. In Examples 18 and 19, the millbase was mixed with either the whole of Charge P (Example 18) or the whole of Charge Q (Example 19). In all three Examples, the mixtures so obtained were each stirred together with 1.7 g cobalt octoate drying agent. Finally 106 g of water was stirred into each mixture to give a gloss paint having a Cone and Plate Viscosity 3.4 to 3.6 poise.

The paints were each applied to a glass plate at 20° C. and relative humidity of 50% and allowed to dry for 24 hours.

The specular gloss of the three dried coatings were then measured according to ASTM Test D523 using light reflected at an angle of 20° C. to the normal to the dried coating. The following results were obtained:

| Example | Gloss |
| --- | --- |
| 17 (no particles) | 63 |
| 18 (with particles) | 73 |
| 19 (with particles) | 74 |

It was also found that paints made according to Examples 18 and 19 had improved water spot resistance (Method B). All three paints lap well at 8 minutes.

EXAMPLE 20

Improved Gloss achieved by Use of 'Ropaque' Particulate Insoluble Material

The gloss of a water-based autoxidisable air-drying paint was improved by the incorporation of 'Ropaque' particulate organic insoluble material as follows:

Firstly a millbase was made by adding to 16.5 parts by weight of a slightly alkaline fully neutralised carboxylic acid copolymer to a 2.5 liter can. The neutralised solution was obtained by taking an unneutralised solution consisting of 42.5 wt % MHP solvent and 57.5 wt % of partially esterified carboxylic acid copolymer made according to the procedure of Example 2 and adding just sufficient of a 10 wt % aqueous solution of sodium hydroxide to neutralise 105% of the carboxylic acid moieties so achieving full neutralisation plus a 5% excess of alkali. The solution was stirred at 1000 rpm and then 18.7 parts pigment grade rutile titanium dioxide was added over a period of 5 minutes during which time the stirring was increased to 1500 rpm. Then after completion of the addition of the titanium dioxide, 0.07 parts of 'Dispelair' CF246 antifoaming agent (available from Blackburn Chemicals, Whitebirk Industrial Estate, Blackburn, England) was added and stirring continued at 1500 rpm for a further 30 minutes to produce the finished millbase.

28.6 parts of thixotropic agent was added to the millbase and the mixture was stirred at 250 rpm. Next 9.7 parts of the dispersion made by adding Charge N to Charge M for the purposes of Example 19 was added followed by 9.6 parts 'Ropaque' OP62 polymer particles, then 0.53 parts cobalt drying agent solution as used in Examples 17 to 19, 0.02 parts of a proprietary antiskimming agent, 0.07 parts of "Dispelair" CF 246 and finally about 16.2 parts water where the precise amount of water added was adjusted to ensure that the paint had a Cone and Plate Viscosity of 2.7. The number average particle diameter of the "Ropaque" OP62 particles was 500 nm.

The paint was applied to a substrate and after 24 hours it was found to have gloss factor of (as measured as Examples 17 to 19) of 83% and a water spot resistance comparable to that achieved in Examples 18 and 19. The paint laps well at 8 minutes.

EXAMPLE 21

Use of Ammonium Cations

The procedure of Example 2 was repeated except that the partially esterified carboxylic acid copolymer was neutralised using aqueous ammonia instead of sodium hydroxide. The coating composition obtained was subjected to the Discolouration Test hereinbefore described. The change in CIELAB B value obtained was 6.7 as compared with 3.0 when the neutralising ion was sodium. In other respects, the composition is similar to those neutralised by Group 1 ions.

COMPARATIVE EXAMPLE I

The Unsuitability of Linseed Oil Fatty Acid—Glycidyl Methacrylate Adduct as a total Replacement for Allyl Glycidyl Ether An attempt was made to use a 21.3 wt % glycidyl methacrylate adduct of linseed oil fatty acid as a total replacement for allyl glycidyl ether. Firstly the adduct was made as follows:

240 g linseed oil fatty acid was added to 213 g glycidyl methacrylate together with 3.2 g benzyl trimethyl ammonium hydroxide condensation catalyst. The mixture was heated to 130° C. for about 4 hours whereupon the adduct was formed. It was found to have an acid value of 10.2 mg KOH/g adduct and an epoxide value of 2.9 mg KOH/g adduct. This adduct was used in a copolymerisation as follows:

387 g MHP was heated to 120° C. under reflux. Then to the refluxing MHP, was added a mixture consisting of 173 g of the above adduct, 36.5 g acrylic acid, 301 g methyl methacrylate, 301 g ethyl acrylate and 24.4 g azobis-isobutyronitrile copolymerisation initiator (half-life at 125° C. of 0.76 mins). The mixture was added slowly over a period of 3 hours and then the system was kept refluxing at 120° C. for a further 30 minutes. Next a further 8.1 g initiator was added in six equal feeds made at 10 minute intervals and finally the system (still refluxing at 120° C.) was held for a further 45 minutes. A copolymer was obtained which contained 21.3 wt % of the adduct and had an epoxy value of 2.7 mg KOH/g adduct.

The copolymer was obtained as a very viscous solution which required dilution with further MHP in order to permit full neutralisation. Accordingly 50 g of the copolymer solution obtained above was diluted with 11.6 g MHP and then neutralised by addition of 8.5 g of a 10 wt % aqueous solution of sodium hydroxide. The solution was still too viscous for use as a coating composition presumably because of the highly hydrophobic nature of the linseed oil moieties. Therefore an attempt was made to dilute the solution further by adding 55.1 g water to produce a composition having a solids content of only 28 wt %. Dilution caused precipitation of copolymer from the solution leading to a partially gelled system unsuitable for use as a gloss paint.

The partially gelled system composition was subjected to the Water Spot Resistance Test (Method A) and found to have a water resistance rated at "poor" on the scale use in Table 4. Attempts to improve water resistance by using a higher concentration of the adduct (namely 30 wt %) resulted in the formation of a fully gelled composition on dilution with water.

We claim:

1. A water-based autoxidisable air-drying coating composition suitable for application at ambient temperatures which comprises water, a minor amount of water-miscible organic cosolvent, a drier which promotes autoxidation and partially esterified carboxylic acid film-forming copolymer which is at least partially neutralized by monovalent cations wherein a) the partially esterified carboxylic acid copolymer comprises
      (i) a backbone portion derivable from a prepolymer which prepolymer has a weight average molecular weight (Mw) of at least 3,000 and less than 30,000 and in turn is derivable by addition copolymerization of copolymerizable non-acid monomers with unsaturated monocarboxylic acid monomer and/or itaconic acid and which acid monomers when copolymerized provide carboxylic acid groups to the prepolymer and, wherein the prepolymer has a number average molecular weight (mn), and said prepolymer has a molecular weight distribution such that the ratio Mw/Mn is within the range 2 to 4,
      (ii) 20% to 38% (based on the weight of the partially esterified carboxylic acid copolymer before neutralization) of 3-allyloxy-2-hydroxypropyl moieties or their 2-alkylallyl and/or butyl analogues (that is to say $-CH_2-CH(OH)-(CH_2)n-O-(CH_2)_m-CR=CR'R''$ where R, R' and R'' are H or $C_1$ to $C_8$ alkyl and m and n are 1 or 2) by means of which some but not all of the carboxylic acid groups of the prepolymer are esterified thereby creating the partially esterified carboxylic acid copolymer and
   b) the acid value of the partially esterified carboxylic acid copolymer before neutralization is from 25 to 60 mg KOH/g unneutralized partially esterified copolymer and said partially esterified carboxylic acid copolymer is at least partially neutralized with monovalent Group 1 metal cations;
   c) where the partially esterified carboxylic acid copolymer is such that when measured at 60° C. in a solution consisting of 90 wt % unneutralized partially esterified carboxylic acid copolymer and 10 wt % 1-methoxy-2-hydroxy propane using an oscillatory parallel plate rheometer, the copolymer has a Dynamic Solution Viscoisty of from 1 to 500 Pa. sec.; and
   d) where the partially esterified carboxylic acid copolymer is dispersed into water.

2. A coating composition according to claim 1 wherein the composition comprises from 2 to 25 wt % (based on the weight of water and cosolvent) of organic cosolvent.

3. A coating composition according to claim 1 wherein the composition contains 1-methoxy-2-hydroxy propane as an organic cosolvent.

4. A coating composition according to claim 1 wherein the neutralised copolymer comprises enough monovalent cation to neutralise at least 75 wt % of the non-esterified carboxylic acid groups of the partially esterified carboxylic acid copolymer.

5. A coating composition according to claim 4 wherein the partially esterified carboxylic acid copolymer is fully neutralised.

6. A coating composition of claim 1 wherein the prepolymer comprises from 20 to 50 mol % (based on the prepolymer) of copolymerized monocarboxylic acid monomer selected from acrylic acid and methacrylic acid.

7. A coating composition according to claim 1 wherein the prepolymer comprises from 10 to 70 mol % (based on the prepolymer) copolymerised non-acid monomer of the type which would produce a homopolymer having a Tg (Glass Transition Temperature) of below −10° C.

8. A coating composition according claim 7 wherein the non-acid monomers of the prepolymer include monomers chosen from methyl, ethyl, 2-ethylhexyl, and butyl acrylates and the vinyl esters of a mixture of branched chain acids containing 10 carbon atoms.

9. A coating composition according to claim 1 wherein the prepolymer comprises up to 55 mol % (based on the prepolymer) of copolymerised non-acid monomers of the type which would produce a homopolymer having a Tg of above 30° C.

10. A coating composition according to claim 9 wherein the non-acid monomers of the prepolymer include monomers chosen from methyl methacrylate, vinyl acetate and styrene.

11. A coating composition according to claim 7 wherein the prepolymer also comprises up to 10 mol % (based on the prepolymer) of hydrophilic monomers.

12. A coating composition according to claim 11 wherein the hydrophilic monomers are chosen from hydroxyethyl acrylate, acrylamide, methacrylamide and alkoxy polyethylene glycol methacrylates.

13. A coating composition according to claim 1 wherein the partially esterified carboxylic acid copolymer if fully unneutralised would have a Tg of from −10° C. to 15° C.

14. A coating composition according to claim 1 wherein the nature of the partially esterified copolymer is such that where the copolymer is fully neutralised by sodium cations, it is soluble at least to the extent that a solution comprising 25 wt % anionic moieties derived from the copolymer and 75 wt % of a mixture of equal weights of water and 1-methoxy-2-hydroxy propane (MHP) (where the percentage is based on the combined weights of anionic moieties, water and MHP) should appear clear to the unaided eye after the solution has stood for 48 hours at 20° C.

15. A coating composition according to claim 14 wherein the fully neutralised copolymer is soluble at least to the extent that the solution comprising 25 wt % of the anionic moieties and 75 wt % of the mixture of water and MHP should after standing for 48 hours at 20° C. have a nephelometer turbidity reading of less than 80 nephelometer turbidity units.

16. A coating composition according to claim 1 wherein the composition also comprises dispersed insoluble organic polymeric material wherein the number average particle diameter of the particles is from 50 to 2000 nm.

17. A coating composition according to claim 16 wherein the composition contains from 10 to 50 wt. % of dispersed particles of insoluble organic material based on the combined weights of the particles and anionic moieties of the neutralized copolymer, where the insoluble polymeric material is chemically bonded to hydrophilic molecules to form a stable dispersion in the coating composition and which hydrophilic molecules each contain a hydrophilic moiety and a moiety which bonds to the insoluble organic polymeric material.

18. A coating composition according to any one of claims 17 wherein the insoluble organic polymeric material has a weight average molecular weight of at least 30 000.

19. A coating composition according to claim 17 wherein the number average particle size of the particles of organic polymeric material is from 50 to 1000 nm.

20. A coating composition according to claim 17 wherein the number average particle size of the particles of organic polymeric material is from 100 to 800 nm.

21. A coating composition according to claim 17 wherein the insoluble organic polymeric material comprises copolymerised hydrophilic monomers derived from hydrophilic molecules comprising a polymerisable moiety.

22. A coating composition according to claim 21 wherein the copolymerised hydrophilic monomers are derivable from hydrophilic molecules containing carbon to carbon double bonds.

23. A coating composition according to claim 22 wherein the hydrophilic molecules are chosen from alkoxy polyethylene glycol methacrylates or a reaction product of penaerythritol triallyl ether, butylene oxide and ethylene oxide.

24. A coating composition according to claim 17 wherein the particles each contain one or more voids.

* * * * *